Jan. 31, 1950  J. BELLINGHAUSEN  2,495,678
COMBINATION FARM WAGON
Filed Dec. 26, 1946  2 Sheets-Sheet 2
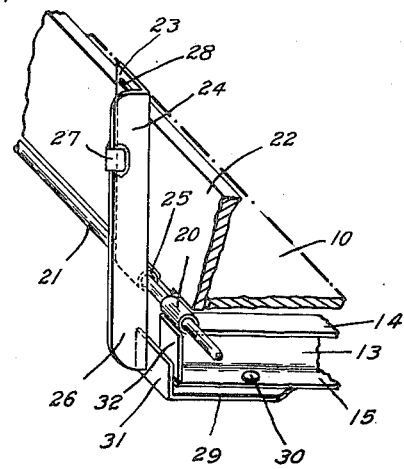
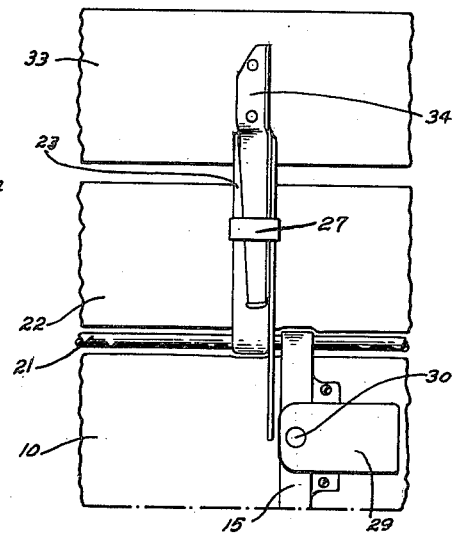
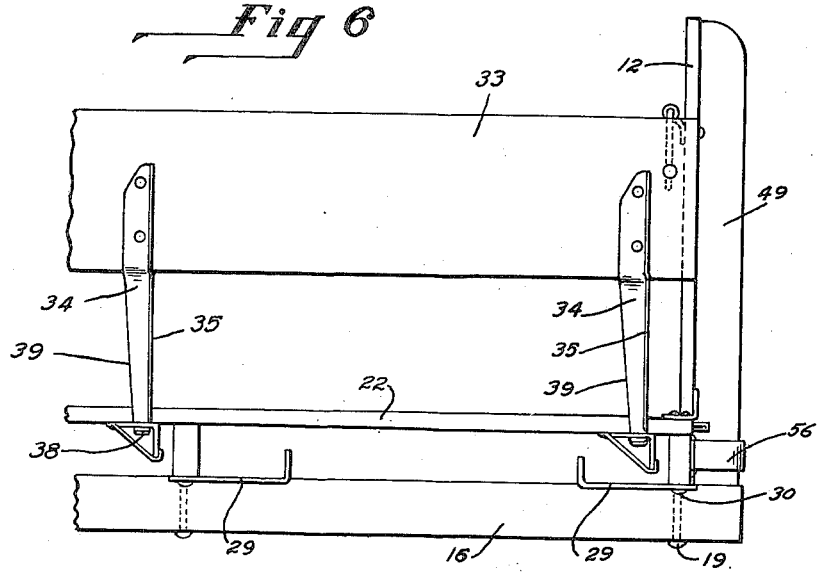
INVENTOR.
John Bellinghausen
BY
Mawhinney & Mawhinney
ATTORNEYS Patented Jan. 31, 1950

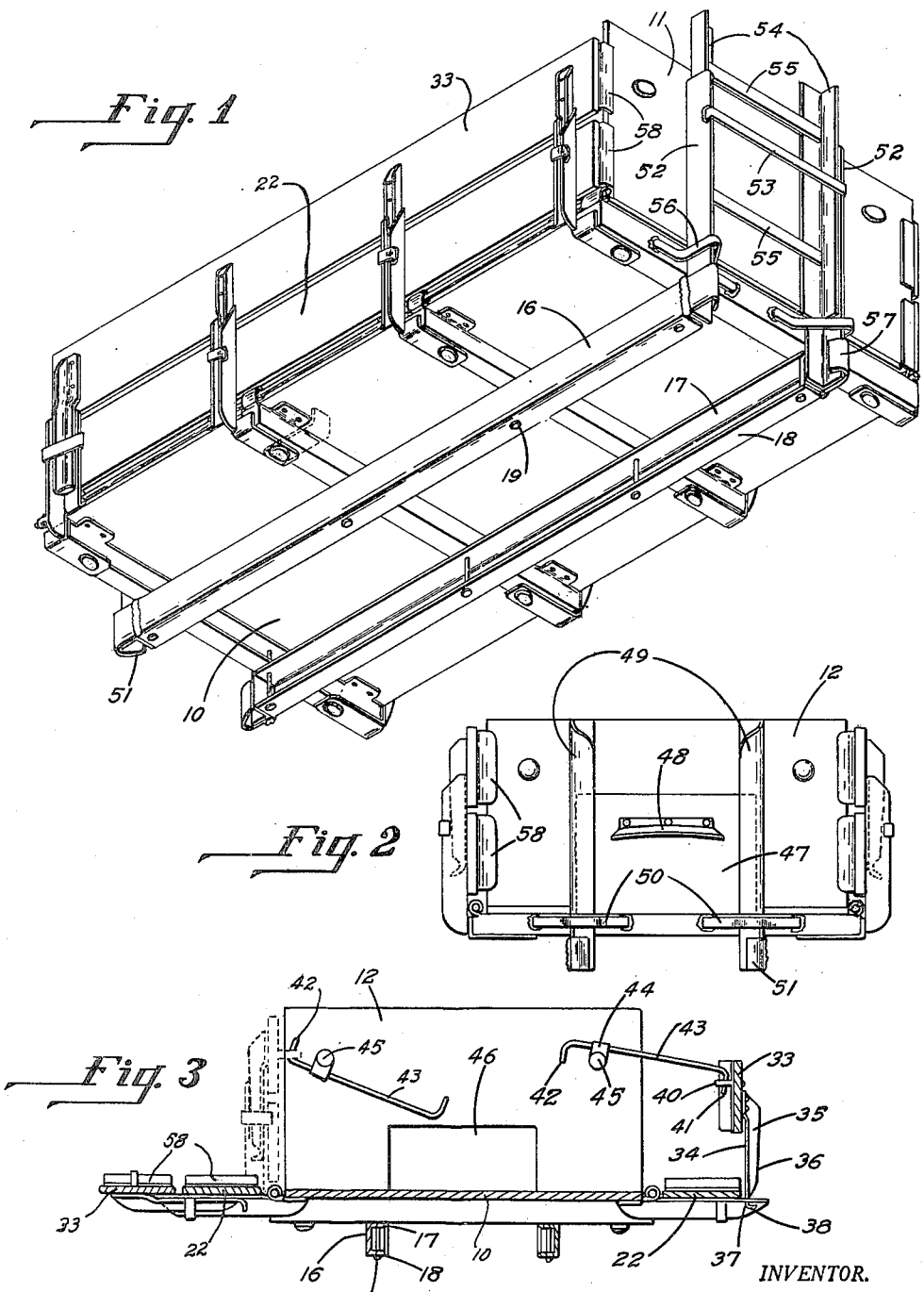

2,495,678

UNITED STATES PATENT OFFICE 2,495,678

COMBINATION FARM WAGON

John Bellinghausen, Carroll, Iowa, assignor of one-half to J. J. Meyers, Carroll, Iowa Application December 26, 1946, Serial No. 718,540

4 Claims. (Cl. 296—13)

The present invention relates to improvements in combination farm wagons and more particularly relates to an all-service wagon or what might be termed a three-in-one wagon in that the device is so constructed and arranged as to admit of the same being assembled to form a grain or wagon box, a hay-rack, and as a flat-box or bed.

An object of the invention is to provide an improved construction of farm wagon box which will permit of its conversion for use as a tight box for the carrying of grain, as a rack for the carrying of hay or as a flat-box or bed for the carrying of machinery or other desired materials; the construction and arrangement being such that the conversion may be made from the one to the other uses by a simple manipulation of the parts without requiring the aid of any special or other tools of any kind and in which the change-over may be conducted in a minimum of time.

Another object of the invention is to provide an improved farm wagon construction having the three purposes above outlined in which the conversion from the one to the other purpose may be effected without the use of bolts, burrs, cotter-keys or other such mechanical devices which require time in the adjustment.

A further object of the invention resides in providing an improved combination farm wagon convertible for the uses above stated without requiring any special skill on the part of the farmer or farm-hand.

Other objects of the invention are to provide a construction that will wear longer, haul heavier loads, can be used for many more objects on the farm than any other wagon heretofore devised, and will require much less work or time in changing from one box to the other, and for making changes or adjustments in the end gates and the ladders.

With the foregoing and other objects in view, the invention will be more fully described hereinafter and more particularly pointed out in the appended claims.

In the drawings, in which like parts are denoted by the same reference characters throughout the several views, Figure 1 is a perspective view of an improved form of combination farm wagon constructed in accordance with the present invention and shown in one position.

Figure 2 is an end elevation of the same taken from the rear end or left end of Figure 1.

Figure 3 is a vertical transverse section showing the sides of the box in the three positions of use.

Figure 4 is a fragmentary perspective view showing a detail of the pivot connection and latch.

Figure 5 is a fragmentary bottom plan view of the wagon bed and the side boards extended out even therewith.

Figure 6 is a fragmentary side elevation with the lower side board extending flat and the upper side board supported at the outer side thereof as shown at the right in Figure 3 for use as a hay-rack.

Referring more particularly to the drawings, 10 designates a wagon bed, 11 a front end gate and 12 a rear end gate.

The wagon bed 10 may be reinforced by transverse beams, of which four are shown, each composed of a vertical web 13 and horizontal flanges 14 and 15.

Longitudinal beams intersect the transverse beams and may be two or more in number being channel beams with the channels preferably facing one another from opposite sides of the longitudinal center of the wagon. Each such longitudinal beam preferably comprises a vertical web 16 and horizontal flanges 17 and 18. At the intersecting points pins or other fastenings 19 secure the beams together and to the wagon bed 10.

As seen to best advantage in Figure 4 the upper horizontal flanges 14 of the various transverse beams have end portions rolled over to constitute bearings 20 for pintles or rods 21 which extend longitudinally at the sides of the wagon bed 10. On these pintles are pivotally mounted the lower side boards 22 by sustaining members which comprise angle irons, each comprising a base flange 23 riveted or otherwise affixed to the outside surface of the lower side board 22 and an outstanding flange 24 at substantially right angles to the plane of the lower side board 22. From the lower edge of the base flanges 23 are rolled eyes 25 for rotating upon the pintles or rods 21. The outstanding flanges 24 are continued downwards to provide tail-piece stops 26 for engaging underneath the bottom of the wagon bed 10 in the dropped or lowered position of the lower side boards 22, as shown in Figure 3. Keepers 27 extend angularly across the outer ends of the flanges 23 and 24. The upper ends of the flanges 23 project above the upper edge of the lower side board 22 and have slots 28 for a purpose hereinafter described.

Detents 29 are pivoted, as at 30, beneath the lower horizontal flanges 15 of the transverse beams and have angularly turned latch terminals 31 adapted to engage back of the stops 26 to hold the side boards 22 in the erect position shown in Figure 4. Steadying end walls 32 are bent over right angularly from the vertical webs of the transverse beams at the ends thereof in position to back or reinforce the latch ends 31 when pressure is placed upon the same by the stops 26.

Upper side boards 33 have affixed thereto the base flanges 34 of companion sustaining members having also outstanding flanges 35 with inclined outer edges 36. The second sustaining members 34, 35 are adapted to slide down within the first-named sustaining members 23, 24, as shown in Figure 5, the keepers 27 retaining the couples in united relationship in a position to sustain the upper side boards 33 directly above and in substantially the same planes with the lower side boards 22. The base flanges 34 project downwardly below the companion flanges 35 to form downwardly-projecting claws 37 having outturned terminals 38 for engaging through the slots 28 as shown in Figure 6 and at the right of Figure 3. Figure 6 also shows the inclined edges 39 of the base flanges 34 so that these sustaining members 34, 35 are virtually of taper form diminishing progressively downward whereby to fit with a frictional and jamming fit within the keepers 27 of the lower sustaining members 23, 24. In this way the upper side boards 33 may be frictionally held in a slightly spaced condition above the lower side boards 22 as shown in Figures 1 and 5 or may be pushed all the way down against the lower side boards 22 to form a tight grain wagon box.

As shown more particularly in Figure 3 eyes 40 are affixed to the inner upper portions of the upper side boards 33 near the ends thereof to be in position to be engaged by the latch ends 41 or 42 of latch rods 43 slidable through swivel holders 44 pivoted as indicated at 45 upon the tail gates 11 and 12. Figure 3 shows the position of the latch rods 43 with reference to the eyes 40 in two positions of the side walls.

As shown more particularly in Figure 3 the tail gate is formed with a discharge opening 46 normally closed by a sliding door 47 having a handle 48 by which it may be raised or lowered. The door is vertically slidable in channel guides 49 secured to the tail gate 12. Straps 50 embrace the lower portions of the guides 49 and are affixed to the vertical web of an end transverse beam.

As best shown at the left end of Figure 1 the ends of the longitudinal beam webs 16 are bent about the lower end portions of the guides 49 to assist in holding such guides in place. Such ends of the beams 16 constitute clamps 51.

The front gate 11 has affixed thereto angle guides 52 having a confining strap 53 thereacross at the outer and upper portion thereof so as to slidably confine the ladder 54. This ladder has rungs 55. Straps 56 extend about the lower end portions of the angle guides 52 and are fastened to the vertical web of the front transverse beam. Clamps 57 are bent over from the front ends of the longitudinal beams 16 in order to embrace the lower ends of the angle guides 52. The angle guides 52 with the tail gate 11 may be lifted out of the straps 56 and the clamps 57. In like manner the rear tail gate 12 with the channel guides 49 may be lifted out of the straps 50 and the clamps 51.

Angle guides 58 are mounted upon the side boards 22 and 33 at the ends thereof to press upon the outside surfaces of the front and rear tail gates 11 and 12 when the sides are erected.

In the use of the device, Figure 1 shows the wagon body assembled as a closed box with the sides erected. This condition is shown in dotted lines at the left of Figure 3 in which the latch rods 43 have been rotated upon the pivots 45, slid inwardly through the swivel holders 44 and then rotated in a clockwise direction about the pivots 45 to engage the outer angularly latch ends 41 upwardly through the eyes 40. The pivots 45 will frictionally hold the swivel holders 44 in any angularly adjusted position.

In this upright position the couples forming the sustaining members are telescoped or slid together so that the keepers 27 retain the upper side boards 33 in alignment above the lower side boards 22 and both side boards pivot about the pivot rods 21.

As shown to the left of Figure 3 in full lines both side boards 22, 33 have been folded downwardly and outwardly about the pintle centers 21 in order to form the flat box or bed. In this position the stops 26 engage beneath the wagon bed 10 so as to sustain the sides in the horizontal position in prolongation of such wagon box 10.

At the right of Figure 3 is shown the arrangement of parts as a hay-rack. Here the lower side boards 22 are let down to the horizontal position supported by the stops 26 but the sustaining members are withdrawn from the keepers 27 and the upper side boards 33 erected or placed in a vertical position with the sustaining members 34, 35 disposed vertically downward and with the claws 37, 38 thereof interlocked in the slots 28 of the companion sustaining members. In this position the flanges 35 resting upon the projecting parts of the base flanges 23 will support the upper side boards 33. In this position the latch rods 43 are rotated about the pivots 45 approximately 180° from the position shown at the left of Figure 3 and such latch rods 43 are pulled outwardly through the swivel holders 44 to an extended position where the outer latch members 41 engage downwardly through the eyes 40 of the upper side boards 33. The inner ends 42 may constitute handles for manipulating the latch rods 43.

The present structure can very easily be converted to any one of the three positions shown in Figure 3 by simply operating the latch rods 43 and the sustaining members without the use of any tools or without the adjustments of nuts, bolts or the like.

It will be appreciated that according to the present invention a standard width wagon bed may be employed without diminution to compensate for the devices for converting the same into the various uses. In existing constructions now on the market the wagon bed is either narrowed so that it does not have the capacity required by the farmer or it is of standard width and the sustaining means are so bulky and extend so far beyond the sides of the wagon box that they prevent the wagon from entering barns and for moving through other places through which farmers are accustomed to drive wagons of this character.

Moreover the construction may be used in the husking of corn inasmuch as the wagon box is not wider than two rows of the corn.

Also there are no hinges to become frozen or clogged and the side boards therefore have freedom of movement at all times. For this reason the farmer will find much less difficulty in cleaning the rack of that part of the hay or straw resting near the bottom of the load.

While I have disclosed herein the best form of the invention known to me at the present time, I desire it to be understood that I reserve the right to make changes and modifications in the herein described embodiment of the invention provided such changes fall within the scope of the following claims.

What I claim is:

1. In a combination farm wagon, a wagon bed, a detent pivoted beneath the wagon bed and having an angular end bent upwardly forming an abutment, lower side boards pivoted to said wagon bed and movable to an upright position or to a flat position with respect to said wagon bed, upper side walls, sustaining means for maintaining said upper side boards in substantial alignment with the lower side boards in either upright or flat position or in independent upright position at the outer side of the lower side boards when in the lowered position, a downwardly projecting tail piece from each of said sustaining means positioned to engage with said abutment of said detent in one position of said detent and to engage with the bottom of the wagon bed when the lower side boards are in the flat position, and means on the bottom of said wagon box for steadying the angular end of said detent.

2. In a combination farm wagon, a wagon bed, front and rear end walls, a detent pivoted beneath the wagon bed and having an angular end bent upwardly forming an abutment, lower side boards pivoted to said wagon bed and movable to an upright position or to a flat position with respect to said wagon bed, upper side boards, sustaining means for maintaining said upper side boards in substantial alignment with the lower side boards in either upright or flat position or in independent upright position at the outer side of the lower side boards when in the lowered position, downwardly projecting tail pieces from said sustaining means positioned to engage the abutment of said detent in one of its positions and to engage with the bottom of the wagon bed in the other of its positions when the lower side boards are in the flat position, an eye carried on the inner side of each of said upper side boards, and locking means slidably and pivotally mounted at each side of said front and rear end walls positioned to engage said eye and retain said upper walls in a predetermined position.

3. A combination farm wagon as claimed in claim 2 wherein the sustaining means on the lower side board is provided with a horizontal slot near the free end thereof for receiving a hook carried by the lower end of the sustaining means on the upper board for holding said upper board substantially normal to said lower board.

4. A combination farm wagon as claimed in claim 2 characterized by the fact that said locking means comprises a substantially U-shaped member having an elongated intermediate portion with hook like ends and a pivot proximate one of the end hooks, the pivot permitting selective engagement of either hook with an eye carried by the upper side walls.

JOHN BELLINGHAUSEN.

REFERENCES CITED

The following references are of record in the file of this patent:

UNITED STATES PATENTS

| Number | Name | Date |
|---|---|---|
| 165,789 | Cass | July 20, 1875 |
| 459,847 | Tracy | Sept. 22, 1891 |
| 866,685 | Salisbury et al. | Sept. 24, 1907 |
| 953,509 | Bird | Mar. 29, 1910 |
| 1,048,799 | Boldig | Dec. 31, 1912 |
| 1,166,877 | Younce | Jan. 4, 1916 |
| 1,259,403 | Hunt | Mar. 12, 1918 |
| 2,133,902 | Patrick | Oct. 18, 1938 |

FOREIGN PATENTS

| Number | Country | Date |
|---|---|---|
| 558,916 | France | June 4, 1923 |